United States Patent [19]

Yuzawa et al.

[11] Patent Number: 4,505,248
[45] Date of Patent: Mar. 19, 1985

[54] HOT-WIRE AIR FLOWMETER CONTROL SYSTEM FOR ENGINE

[75] Inventors: Haruo Yuzawa; Kazuhiro Sunamura, both of Yokohama, Japan

[73] Assignee: Nissan Motor Company, Limited, Yokohama City, Japan

[21] Appl. No.: 621,254

[22] Filed: Jun. 15, 1984

[30] Foreign Application Priority Data

Jan. 21, 1983 [JP] Japan .................. 58-111727

[51] Int. Cl.$^3$ ............................ F02M 33/02
[52] U.S. Cl. .................. 123/519; 123/494; 123/488; 123/518; 123/520
[58] Field of Search .......... 123/488, 494, 519, 518, 123/520

[56] References Cited

U.S. PATENT DOCUMENTS

| | | |
|---|---|---|
| 4,013,054 | 3/1977 | Balsley . |
| 4,089,214 | 5/1978 | Egami . |
| 4,334,186 | 6/1982 | Sasayama . |
| 4,343,281 | 8/1982 | Uozumi ........................ 123/519 |
| 4,446,838 | 5/1984 | Suzuki . |
| 4,448,172 | 5/1984 | Kashiwaya . |

Primary Examiner—Ronald B. Cox
Attorney, Agent, or Firm—Schwartz, Jeffery, Schwaab, Mack, Blumenthal & Koch

[57] ABSTRACT

In an internal combustion engine provided with a hot-wire air flowmeter and a canister for supplying fuel evaporated from a fuel tank into an intake passage, there exists a state where an excessively-rich mixture is supplied from the canister to the intake passage because of trouble of the canister and therefore engine stops. If the hot wire is heated in such a state as described above for removal of contaminations sticked onto the hot wire after an ignition switch has been turned off, there exists a problem such that rich mixture may be fired by the heated hot wire. To overcome this problem, an engine stop detecting means is additionally provided in order to inhibit the hot-wire from being heated up when the ignition switch is turned off after engine stop. That is, the hot wire is heated only when the engine is running before the ignition switch is turned off.

5 Claims, 3 Drawing Figures

HOT-WIRE AIR FLOWMETER CONTROL SYSTEM FOR ENGINE

BACKGROUND OF THE INVENTION

1. Field of the Invention

The present invention relates generally to a hot-wire air flowmeter control system for an internal combustion engine, and more particularly to a system for controlling a hot-wire air flowmeter including a hot wire provided for an internal combustion engine having a canister for storing and supplying fuel evaporated from a fuel tank into an intake passage according to engine operating conditions. The hot wire is disposed within an intake passage to measure the amount of air when cooled, and heated up at appropriate timings to burn out contamination sticked thereonto.

2. Description of the Prior Art

Conventionally, system for controlling a hot-wire air flowmeter provided for an internal combustion engine are well known. For instance, one of these systems is disclosed in Japanese Published Unexamined Patent Application No. S56-146022 for HOSOBUCHI, Electronically-Controlled Fuel Injection System.

The hot-wire is usually disposed within an intake passage in order to measure the amount of air flowing through the intake passage on the basis of the amount of heat radiated from the hot wire when cooled by the flowing intake air. The amount of fuel to be injected into an internal combustion engine is determined on the basis of the amount of intake air measured by the hot-wire air flowmeter. By the way, the hot wire is often heated up to about 1000° C. for a fixed time period (e.g. 1 to 2 seconds) by passing a large current therethrough in order to burn out contaminations sticked onto the hot wire. In heating up the hot wire, since the hot wire is cooled when the intake air is flowing through the intake passage and therefore the burning temperature of the hot wire is reduced, the hot wire must be heated up when the speed of intake air is zero, that is, when the engine is stopped perfectly. To determine the state where the engine is kept stopped, the condition that an ignition switch is turned off is usually detected and a large current is passed through the hot wire when a predetermined time period (e.g. 5 seconds) has elapsed after the ignition switch is turned off.

On the other hand, a canister is often provided for an internal combustion engine for storing fuel evaporated from a fuel tank and for supplying or restoring the fuel stored therein into the intake passage according to the engine operating conditions. To supply the fuel stored in the canister to the intake passage, a purged air control valve is provided for the canister. This control valve is opened or closed in dependence upon the difference in pressure between the upper stream side and the lower stream side of a throttle valve arranged within the intake passage.

In an internal combustion engine provided with both the hot-wire air flowmeter and the canister, in case fuel stored within the canister is excessively supplied into the intake passage due to canister trouble such that the purged air control valve malfunctions and therefore the engine stops, there exists a problem in that the rich mixture is fired within the intake pasage when the hot wire is heated for contamination removal after the ignition switch has been turned off.

A more detailed description of the prior-art hot-wire air flowmeter control system for an internal combustion engine provided with a canister will be made hereinafter with reference to the attached drawing under DESCRIPTION OF THE PREFERRED EMBODIMENTS.

SUMMARY OF THE INVENTION

With these problems in mind, therefore, it is the primary object of the present invention to provide a hot-wire air flowmeter control system for an internal combustion engine having a canister whereby the hot wire is inhibited from being heated up when there exists a possibility such that fuel remaining within the intake passage may be fired. In practice, the hot wire is allowed to be heated up only when the engine is running before the ignition switch is turned off and inhibited from being heated up when the engine is stopped before the ignition switch is turned off.

To achieve the above-mentioned object, the hot-wire air flowmeter control system according to the present invention comprises (a) ignition detecting means for detecting whether an ignition switch is turned on or off; (b) engine stop detecting means for detecting whether an engine is running or stopped; and (c) air-flowmeter controlling means having: air-flow measuring means for measuring the amount of air flowing through an intake passage on the basis of the amount of heat radiated from the hot wire when cooled by the air; burning means for allowing a large current to pass through the hot wire for a fixed time period to heat up the hot wire for removal of contaminations sticked onto the hot wire; and large-current controlling means responsive to said ignition detecting means and said engine stop detecting means for activating said burning means to allow a large current to pass through the hot wire for the fixed time period when a first predetermined time period has elapsed after said ignition detecting means detected that the ignition switch was turned off, only when said engine stop detecting means detects that the engine is running a second predetermined time period before said ignition detecting means detects that the ignition switch is turned off.

BRIEF DESCRIPTION OF THE DRAWINGS

The features and advantages of the hot-wire air flowmeter control system for an internal combustion engine according to the present invention over the prior-art control system will be more clearly appreciated from the following description of the preferred embodiments of the invention taken in conjunction with the accompanying drawings in which like reference numerals designate the same or similar elements or sections throughout the figures thereof and in which.

BRIEF DESCRIPTION OF THE PREFERRED EMBODIMENTS

To facilitate understanding of the present invention, reference will be made to a prior-art hot-wire air flowmeter control system for an internal combustion engine having a canister, with reference to the attached drawing.

Figure 1:
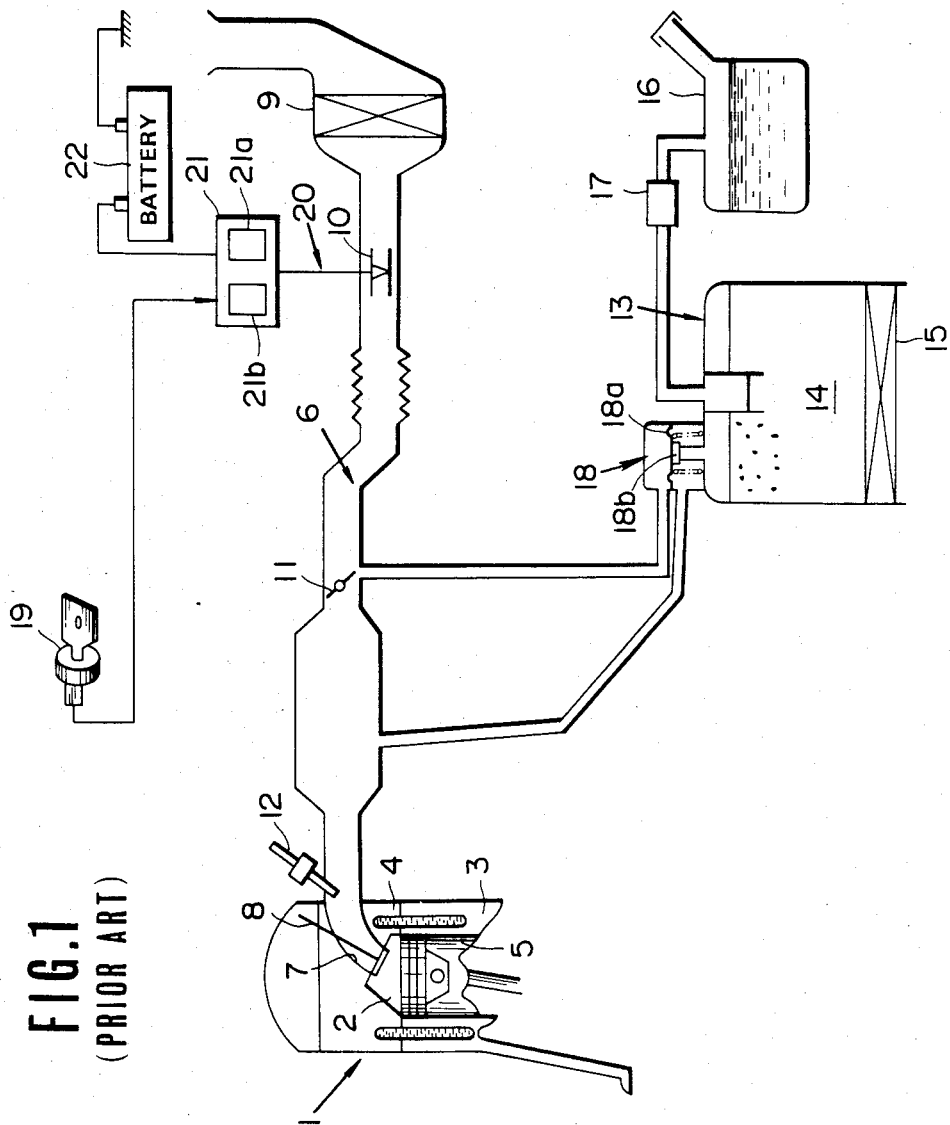
FIG. 1 is a diagrammatical illustration of an example of prior-art hot-wire air flowmeter control systems for an internal combustion engine having a canister.

FIG. 1 is a diagrammatical illustration of an internal combustion engine provided with a hot-wire air flowmeter and a canister. In the drawing, an internal combustion engine 1 includes a combustion chamber 2 formed by a cylindrical block 3, a cylinder head 4 and a piston 5. An intake passage 6 for introducing outside air into the combustion chamber 2 is connected to the top of the combustion chamber 2 through an intake port 7 which is opened or closed by an intake valve 8. Within the intake passage 6, there are provided an air cleaner 9, a hot wire 10 of an air flowmeter 20, a throttle valve 11 and a fuel injector 12 in order from the upper stream side thereof to the down stream side thereof. The air cleaner 9 disposed on the most upper stream side of the intake passage 6 removes dust or dirt included in the outside air introduced into the intake passage 6. The fuel injector 12 disposed on the most down stream side of the intake passage 6 injects fuel toward the intake port 7. The amount of fuel to be injected toward the intake port 7 is determined on the basis of the amount of outside air introduced into the intake passage 6, which is controlled by the throttle valve 11 disposed midway between the air cleaner 9 and the fuel injector 12 within the intake passage 6.

The amount of outside air introduced into the intake passage 6 is measured by the hot-wire air flowmeter 20. The flowmeter 20 is mainly made up of the hot wire 10 (e.g. platinum wire) disposed between the throttle valve 11 and the air cleaner 9 within the intake passage 6 and a control unit 21 including an air flow measuring section 21a and a hot-wire burning section 21b disposed outside the intake passage 6. The measuring section 21a determines the amount of intake air introduced into the intake passage 6 on the basis of the amount of heat radiated from the hot wire 10 when cooled by the intake air flowing through the intake passage 6. In determining the amount of intake air, for instance, it is possible to adopt a constant temperature method. In more detail, when the speed of intake air increases and therefore the hot wire is cooled, since the temperature of the hot wire drops according to the magnitude of the speed of intake air, a current passed through the hot wire is increased by adjusting a variable resistor so that the temperature of the hot wire is restored to the original temperature obtained when the speed of intake air is zero. By measuring the magnitude of the current additionally passed through the hot wire, it is possible to indirectly detect the speed of intake air. In the above mentioned, a bridge circuit is usually used by connecting the hot wire to one part of bridge circuit. In the bridge circuit, current flowing through a bridge amperemeter is so controlled as to be reduced to zero or balanced by increasing the magnitude of current additionally passed through the hot wire. On the other hand, when the speed of intake air increases and therefore the hot wire is cooled, since the resistance of the hot wire changes, it is also possible to detect the speed of the intake air by measuring the hot wire resistance. Once the speed is determined, it is comparatively easy to determined the amount of intake air by multiplying the speed by the cross-sectional area of the intake passage 6, because the cross-sectional area thereof is substantially constant.

In FIG. 1, the reference numeral 13 denotes a canister (small metal case) provided for the internal combustion engine 1. Within this canister 13, an adsorbent such as active carbon 14 is put. Under the bottom of the canister 13, an air filter 15 is disposed. The upper portion of the canister 13 is connected to the upper space of a fuel tank 16 through a one-way check valve 17 for unidirectionally supplying the evaporated fuel within the fuel tank 16 to the active carbon 14 in the canister 13. That is to say, the fuel absorbed by the active carbon 14 is prohibited by the one-way check valve 17 from being supplied back from the canister 13 to the fuel tank 16.

At the upper portion of the canister 13, a purged air control valve 18 is disposed. The valve 18 is made up of a valve diaphragm 18a and a valve body 18b fixed at the center of the diaphragm 18a. The diaphragm 18a partitions the valve space into two chambers, that is, an upper chamber and a lower chamber. The upper chamber communicates with the upper stream side of the throttle valve 11; the lower chamber communicates with the downstream side of the throttle valve 11. This purged air control valve 18 opens or closes in dependence upon the difference in pressure between the upper and lower chambers. In more detail, when the engine 1 is not in operation, since pressure is substantially balanced across the throttle valve 11; that is, since there exists no pressure difference between the two chambers, the control valve 18 is closed without supplying the fuel absorbed in the active carbon 14 into the intake passage 6. As a result, fuel evaporated from a fuel tank is only absorbed in the canister 13 without diffusing the evaporated fuel externally. However, when the engine 1 is in operation, since the pressure on the upper stream side of the throttle valve 11 drops below that on the downstream side of the throttle valve 11, the diaphragm 18a moves in the upper direction to open the valve body 18b of the purged air control valve 18, so that mixture or purged air mixed with the fuel absorbed into the active carbon 14 and outside air introduced through the filter 15 of the canister 13 is supplied from the canister 13 to the downstream side of the throttle valve 11 within the intake passage 6. Further, the above-mentioned purged air control valve 18 can control the amount of purged air supplied from the canister 13 according to the amount of intake air, that is, engine operating conditions.

Further, the reference numeral 19 denotes ignition detecting means (e.g. an ignition switch) for detecting ON or OFF condition of an ignition switch. When an ignition switch is turned off, the ignition detecting means 19 outputs a signal to the burning section 21b of the control unit 21. In response to this signal, the burning section 21b directly applies a voltage (e.g. 12 volts) developed across a battery 22 for a fixed time period (e.g. 1 to 2 seconds) to the hot wire 10 in order to heat up it to about 1000° C. Since the battery voltage is directly applied to the hot wire, a large current is passed through the hot wire 10. Further, in this case, since there exists a need of heating up the hot wire after the speed of intake air reduced to zero, the large current is passed through the hot wire 10 when a predetermined time period (e.g. 5 seconds) has elapsed after the ignition switch 19 was turned off. The hot wire 10 heated up to about 1000° C. burns out or removes contaminations such as oil film, inorganic matter, etc. sticked onto the surface of the hot wire 10.

In the prior-art hot-wire air flowmeter control system as described above, however, since a large current is passed through the hot wire 10; that is, since the hot wire 10 is heated up to 1000° C. for burning out the contamination in response to only the signal obtained when the ignition switch 19 is turned off, there exists a problem as follows: In case of canister trouble, for instance, in such a case as when the purged air control valve 18 is abnormally kept opened and additionally fuel evaporated from the fuel tank 16 is overflowed from canister 13 to the intake passage 6, the engine 1 may be stopped because of an excessively rich air-to-fuel mixture. Under these conditions, if the hot wire 10 is heated after the ignition switch 19 has been turned off, the rich mixture within the intake passage 6 will be exploded. In summary, if the hot wire 10 is heated up simply after the ignition switch has been turned off, there exists a danger that fuel within the intake passage 6 may be fired.

In view of the above description, reference is now made to the embodiments of the hot-wire air flowmeter control system for an internal combustion engine having a canister according to the present invention with reference to the attached drawings.

Figure 2:
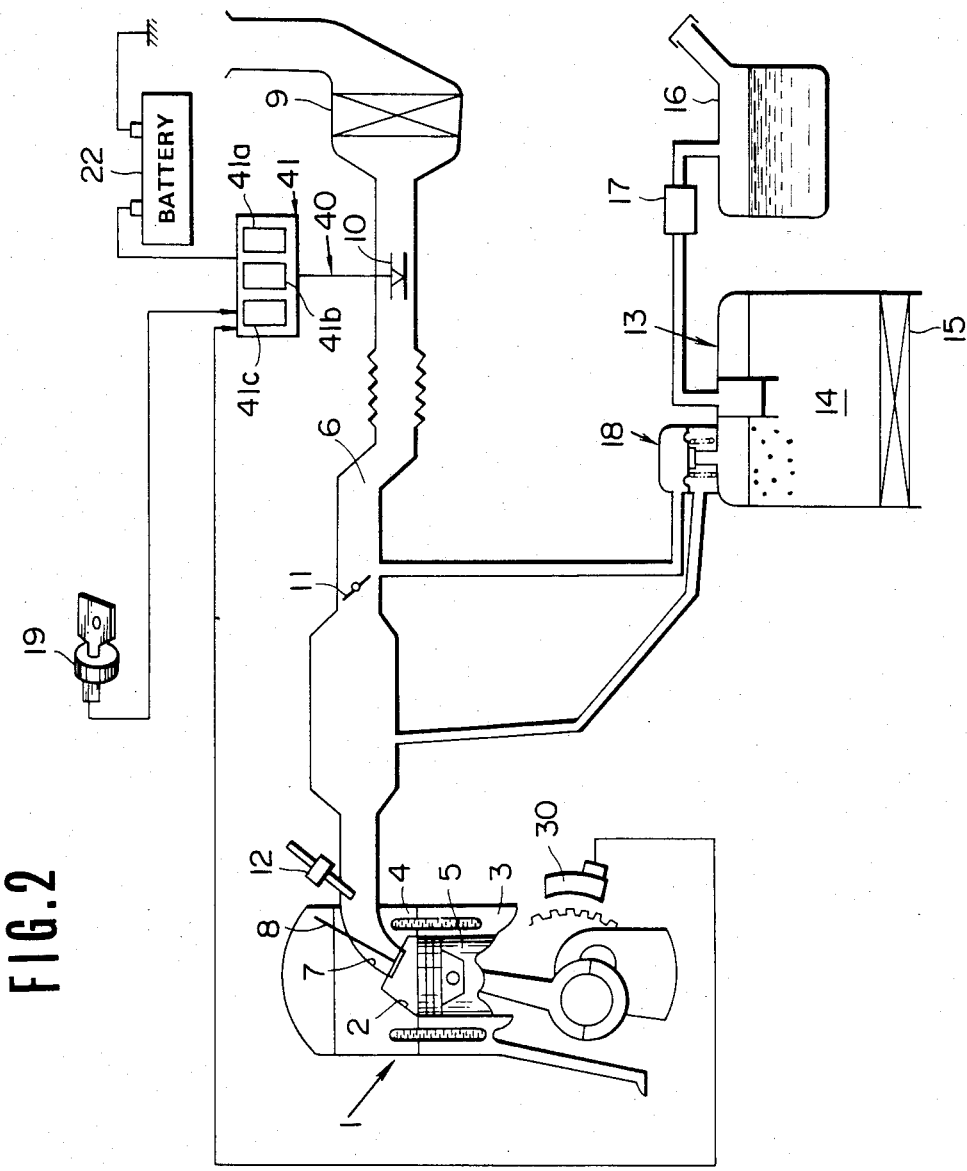
FIG. 2 is a similar diagrammatical illustration of the hot-wire air flowmeter control system according to the present invention for an internal combustion engine having a canister.

Being different from the prior-art hot-wire air flowmeter control system shown in FIG. 1, in the control system according to the present invention shown in FIG. 2, engine stop detecting means 30 is additionally provided and large-current controlling means 41c is additionally incorporated within an control unit 41 for a hot-wire air flowmeter 40.

The engine stop detecting means 30 detects whether or not the internal combustion engine is in operation. In FIG. 2, a crank angular speed sensor is illustrated as the engine stop detecting means 30 by way of example. Therefore, when this sensor 30 outputs no sensor signal, the engine 1 is determined to be stopped. However, without being limited to this type of sensor, it is also possible to adopt other engine speed sensors such as combustion pressure sensor, intake air pressure sensor, exhaust gas pressure sensor, etc. for the engine stop detecting means 30.

On the other hand, the control unit 41 for the hot-wire air flowmeter 40 is made up of three sections of an air flow measuring section 41a, a hot-wire contamination burning section 41b and a large-current controlling section 41c. The air flow measuring section 41a determines the amount of air introduced into the intake passage 6 on the basis of the amount of heat radiated from the hot wire when cooled by the intake air. The burning section 41b allows a large current to pass through the hot wire 10 in order to burn out the contaminations sticked onto the hot wire in an appropriate timing. The large-current controlling section 41c receives a signal outputted from the ignition detecting means 19 (ignition switch) and a signal outputted from the engine stop detecting means 30 (crank angular speed sensor). This controlling section 41c discriminates whether the engine 1 is in operation or not (crank angular speed is zero or not) after the ignition switch 19 is once turned on but before the ignition switch 19 is turned off. In more detail, the controlling section 41c allows a large current to pass through the hot wire 10 for a fixed time period (e.g. 1 to 2 seconds) when a first predetermined time period (e.g. 5 seconds) has elapsed after the ignition switch 19 was turned off, provided that the engine 1 is running a second predetermined time period (e.g. 5 seconds) before the ignition switch 19 is turned off. In other words, the controlling section 41c prohibits a large current from being passed through the hot wire 10 when a first predetermined time period (e.g. 5 seconds) has elapsed after the ignition switch 19 was turned off, provided that the engine 1 is stopped a second predetermined time period (e.g. 5 seconds) before the ignition switch 19 is turned off. This is because if a large current is passed through the hot wire 19 when the ignition switch 19 is turned off after engine has stopped due to an excessively rich air-to-fuel mixture, there exists a danger such that the rich mixture within the intake passage 6 may be fired by the hot wire 10. The elements shown in FIG. 2 other than the engine stop detecting means 30 and the control unit 41 are quite the same as shown in FIG. 1. Therefore, the description of these same elements is omitted herein by designating these by the same reference numerals.

The operation of the hot-wire air flowmeter control system for an internal combustion engine having a canister according to the present invention will be described hereinbelow. The hot-wire air flowmeter 40 measures the amount of air flowing through the intake passage 6 by increasing current to be passed through the hot wire 10 while adjusting a variable resister until the temperature of the hot wire 10 cooled by the intake air is resorted to the original temperature obtained when the speed of the intake air is zero. However, since contaminations included in the air flowing through the intake passage 6 inevitably stick onto the hot wire 10 according to increase in measuring time period, there exists a need of burning out the contaminations such as oil film, inorganic substances, etc. sticked on the hot wire 10 for cleaning. In order to remove the contaminations, a large current is passed through the hot wire 10 for about one to two seconds to heat up the wire 10 to a temperature of approximately 800° to 1,000° C. after the engine has been stopped. The reason why the hot wire 10 is heated up during engine stop is that if the speed of intake air is zero, the heated wire 10 is not cooled by the intake air. The above-mentioned large current to be passed through the hot wire 10 is controlled by the current controlling section 41c and applied to the hot wire 10 through the burning section 41b. Further, in order to increase the burning temperature of the hot wire, it is preferable to decrease the original electric resistance of the hot wire 10 as small as possible.

By the way, in an internal combustion engine provided with the canister 13, in case of canister trouble, for instance where the fuel stored within the canister 13 is excessively supplied from the canister 13 to the intake passage 6 due to malfunction (abnormal opening) of the purged air control valve 18 and therefore the engine 1 stops due to an excessively rich mixture, there exists a danger such that the rich mixture is fired within the intake passage 6 when the hot wire 10 is heated after the ignition switch 19 has been turned off. To overcome the above-mentioned problem, in the control system according to the present invention, the large current controlling section 41c discriminates the state where engine stops before the ignition switch 19 is turned off, in dependence upon the signals outputted from the ignition detecting means 19 and the engine stop detecting means 30. If the engine stops five seconds before the ignition switch 30 is turned off, no large burning current is passed through the hot wire 10 via the burning section 41b. On the other hand, if the engine is in operation 5 seconds before the ignition switch 30 is turned off, a large burning current is passed through the hot wire 10 via the burning section 41b for about 1 to 2 seconds for removal of contaminations sticked on the hot wire, when 5 seconds has elapsed after the ignition switch 19 was turned off.

The structure and the operation of the hot-wire flowmeter control system according to the present invention have been described in dependence upon the control unit 41 made up of different discrete elements such as the air-flow measuring section 41a, the hot-wire contamination burning section 41b, and the large-current controlling section 41c. However, it is of course possible to incorporate the functions of these discrete elements within a microcomputer provided with a central processing unit, a read-only memory, a random-access memory, etc. That is to say, the functions of these discrete elements can be implemented in accordance with appropriate software, in place of hardware. In particular, in the case where a microcomputer is originally provided for controlling other engine operating parameters, it is unnecessary to additionally install these discrete elements.

Figure 3:
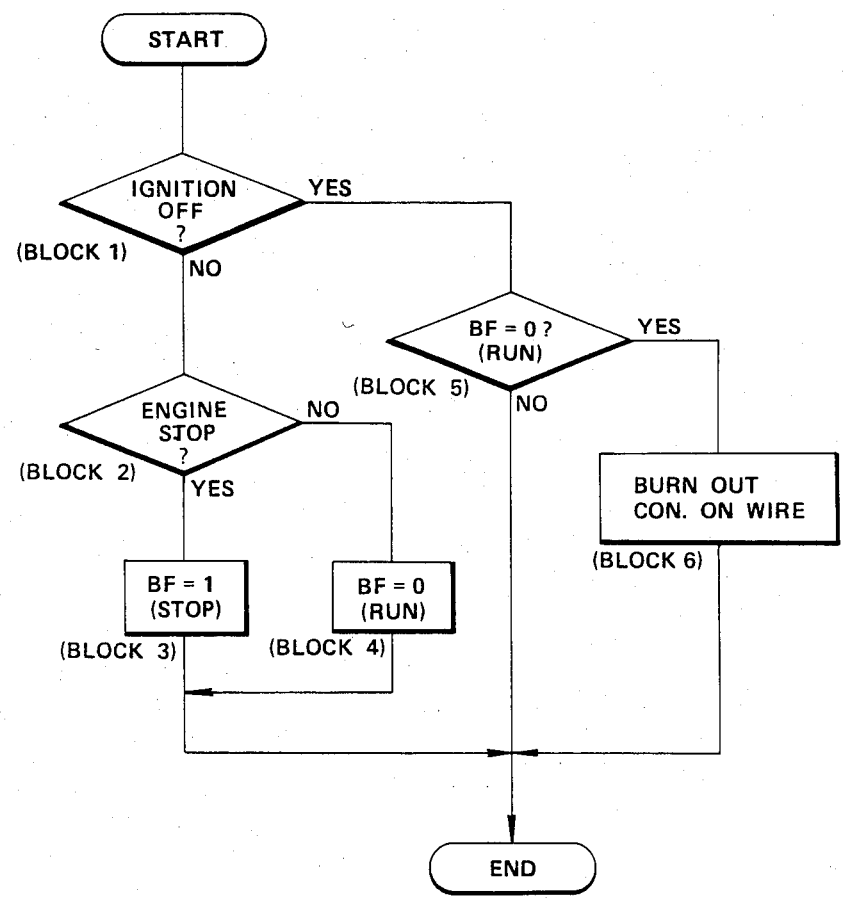
FIG. 3 is an example of control program flowcharts for implementing the essential functions of the hot-wire air flowmeter control system according to the present invention.

FIG. 3 is an example of a control program flowchart for implementing the functions of the large-current controlling sections 41c. This flowchart is implemented at regular time intervals. Control program first checks whether or not the ignition switch is off (in block 1). If the ignition switch is on, the decision of block 1 is NO, so that program advances and checks whether or not the engine is in stopped condition (in block 2). If the engine is in stopped condition, the decision of block 2 is YES, so that program advances and sets a flag BF to 1; that is, BF=1 is set to indicate engine stop (in block 3). If the engine is in running condition, the decision of block 2 is NO, so that program advances and resets the flag BF to 0; that is BF=0; is set to indicate engine running (in block 4). These flag conditions are stored in a memory unit (not shown). Further, if control program determines that the ignition switch is off (in block 1), the decision of block 1 is YES so that program branches and checks whether or not the engine is in running condition or whether the flag BF is reset to 0 (in block 5). If BF=0; that is, the engine is running, the decision of block 5 is YES and therefore program advances and activates the hot-wire burning section 41b for allowing a large current to pass through the hot wire 10 for removal of contaminations sticked thereonto (in block 6). However, if BF=1; that is, the engine is in stopped condition (in block 5), the decision of block 5 is NO and therefore program returns to the start for repeating the above-mentioned control steps. In summary, control program repeatedly checks whether the ignition switch is off or on and whether the engine is running or stopped at predetermined time intervals and activates the hot-wire burning section only when the engine is running before the ignition switch is off.

As described above, in the hot-wire air flowmeter control system according to the present invention, in case the engine stops due to excessively rich mixture supplied from the canister because of trouble of the purged air control valve before the ignition switch is turned off, since the hot wire will not be heated to a high temperature for removal of contaminations, it is possible to avert danger such that rich mixture remaining within the intake passage is fired by the heated hot wire.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A system for controlling a hot-wire air flowmeter including a hot wire provided for an internal combustion engine having an ignition switch and a canister for storing and supplying fuel evaporated from a fuel tank into an intake passage according to engine operating conditions, said control system comprising:
   (a) ignition detecting means for detecting whether the ignition switch is turned on or off;
   (b) engine stop detecting means for detecting whether the engine is running or stopped; and
   (c) air-flowmeter controlling means having:
      (1) air-flow measuring means for measuring the amount of air flowing through the intake passage on the basis of the amount of heat radiated from the hot wire when cooled by the air;
      (2) burning means for allowing a large current to pass through the hot wire for a fixed time period to heat up the hot wire for removal of contaminations sticked onto the hot wire; and
      (3) large-current controlling means responsive to said ignition detecting means and said engine stop detecting means for activating said burning means to allow a large current to pass through the hot wire for the fixed time period when a first predetermined time period has elapsed after said ignition detecting means detected that the ignition switch was turned off, only when said engine stop detecting means detects that the engine is running a second predetermined time period before said ignition detecting means detects that the ignition switch is turned off.

2. The hot-wire air flowmeter control system as set forth in claim 1, wherein said ignition detecting means is an ignition switch.

3. The hot-wire air flowmeter control system as set forth in claim 1, wherein said engine stop detecting means is a crank angular speed sensor.

4. The hot-wire air flowmeter control system as set forth in claim 1, wherein said second predetermined time period is approximately five seconds.

5. A method of controlling a hot-wire air flowmeter including a hot wire provided for an internal combustion engine having an ignition switch and a canister for storing and supplying fuel evaporated from a fuel tank into an intake passage according to engine operating conditions, said control method comprising the following steps of:
   (a) checking whether the ignition switch is on or off;
   (b) if on, checking whether the engine is running or stopped;
   (c) if running, storing this engine-running condition in memory;
   (d) if stopped, storing this engine-stop condition in memory;
   (e) checking again whether the ignition switch is on or off;
   (f) if on, implementing the same steps from (b) to (e) above repeatedly at predetermined time intervals;
   (g) if off, checking whether the engine-running condition or the engine-stop condition is stored in memory;
   (h) if the engine-running condition is stored, allowing a large current to pass through the hot wire for a fixed time period to heat up the hot wire for removal of contaminations sticked onto the hot wire; and
   (i) if the engine-stop condition is stored, implementing the same stops from (a) to (g) above repeatedly.

* * * * *